Figure 1:
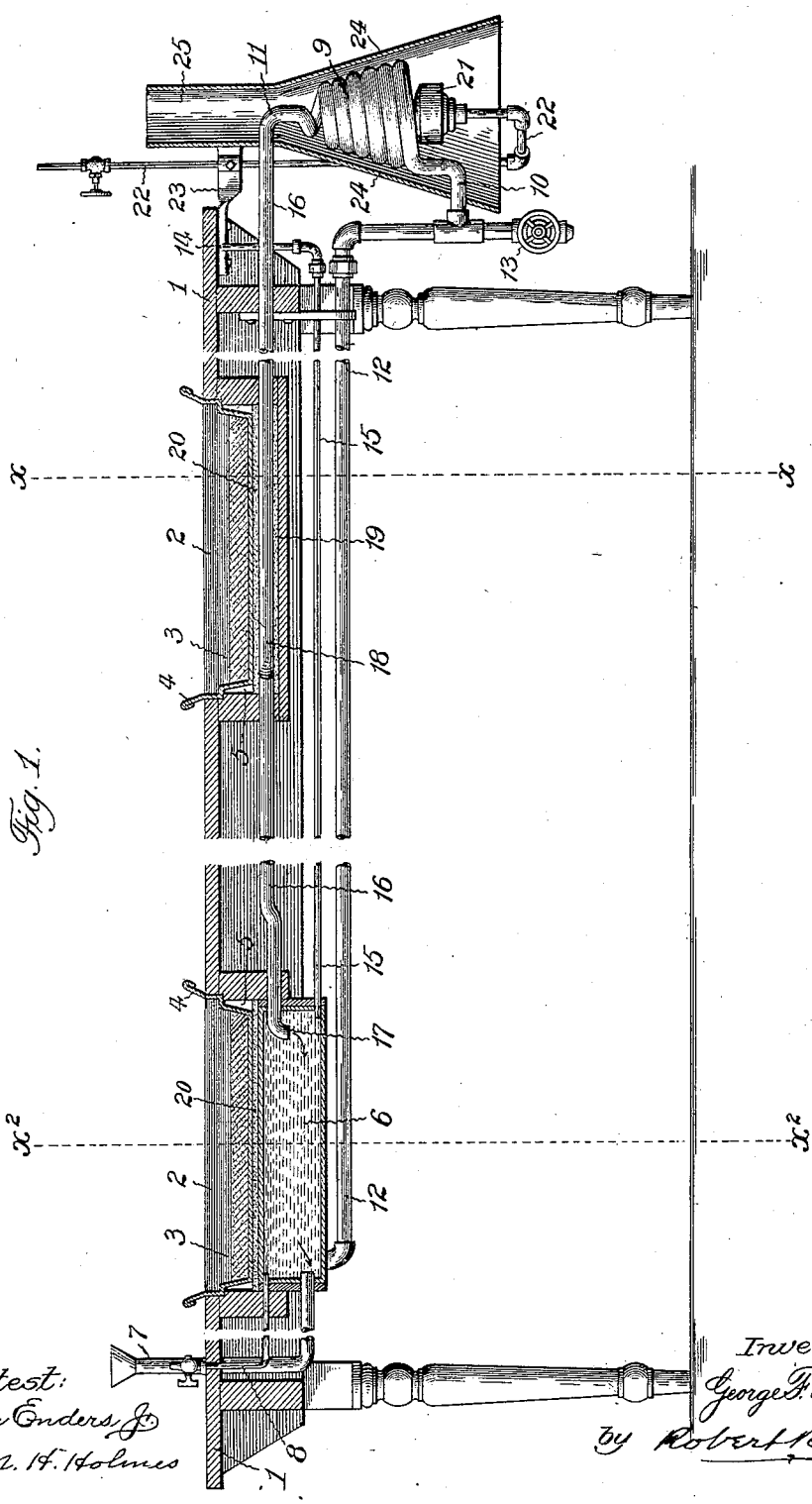

No. 730,748. PATENTED JUNE 9, 1903.
G. F. DICKSON.
CONFECTIONER'S TABLE AND MELTER.
APPLICATION FILED MAR. 16, 1903.
NO MODEL. 2 SHEETS—SHEET 1.

Attest:
John Enders Jr.
M. H. Holmes

Inventor:
George F. Dickson,
by Robert Burns
Attorney.

No. 730,748. PATENTED JUNE 9, 1903.
G. F. DICKSON.
CONFECTIONER'S TABLE AND MELTER.
APPLICATION FILED MAR. 16, 1903.
NO MODEL. 2 SHEETS—SHEET 2.
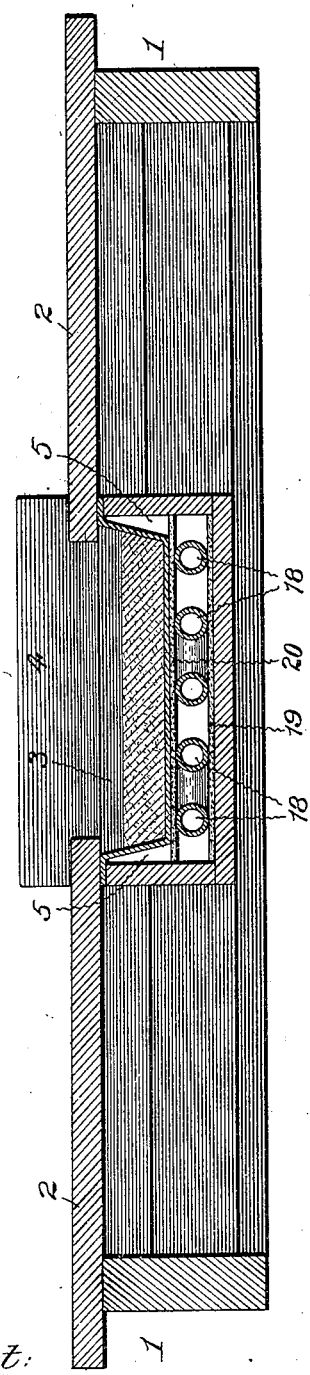
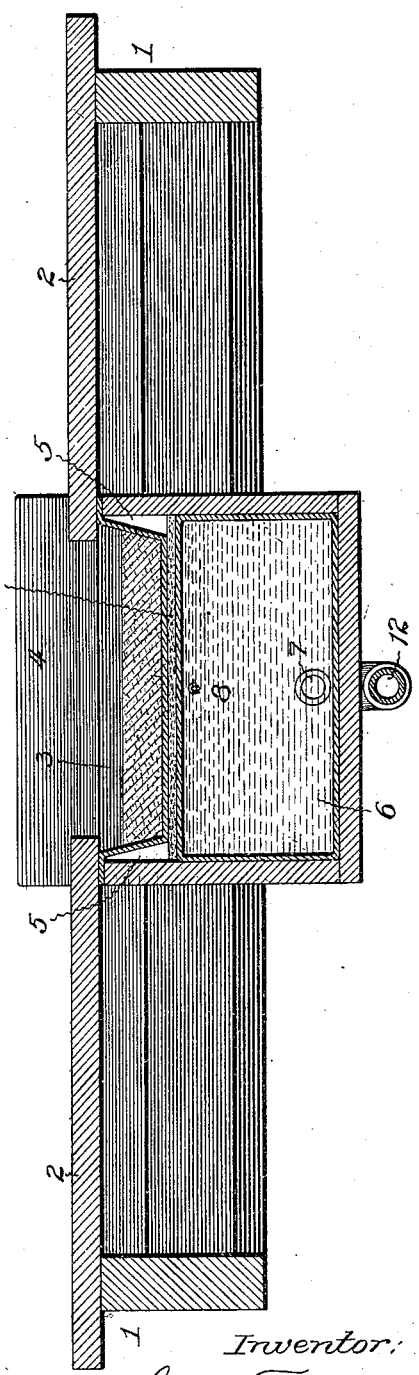
Attest:
John Enders Jr.
M. H. Holmes.
Inventor:
George F. Dickson,
by Robert Burns
Attorney.

No. 730,748. Patented June 9, 1903.

UNITED STATES PATENT OFFICE.

GEORGE F. DICKSON, OF CHICAGO, ILLINOIS, ASSIGNOR TO CONFECTIONERS AND BAKERS SUPPLY CO., A CORPORATION OF ILLINOIS.

CONFECTIONER'S TABLE AND MELTER.

SPECIFICATION forming part of Letters Patent No. 730,748, dated June 9, 1903.

Application filed March 16, 1903. Serial No. 147,928. (No model.)

*To all whom it may concern:*

Be it known that I, GEORGE F. DICKSON, a citizen of the United States of America, and a resident of Chicago, in the county of Cook and State of Illinois, have invented certain new and useful Improvements in Confectioners' Tables and Melters, of which the following is a specification.

The present invention relates to a melting and operating stand or table for confectioners' uses in the manufacture of chocolate and other like confections, and has for its object to provide a simple and efficient construction and arrangement of parts by means of which a constant, mild, and uniform heating effect is attained within the apparatus, so that the chocolate or other similar substance is brought to and maintained in the proper melted and fluid condition without any liability to scorching or burning during an extended period of practical use of the apparatus, all as will hereinafter more fully appear and be more particularly pointed out in the claims.

In the accompanying drawings, illustrative of the present invention, Figure 1 is a longitudinal sectional elevation of an apparatus embodying the present invention. Fig. 2 is an enlarged detail transverse section at line $x\,x$, Fig. 1; Fig. 3, a similar view at line $x^2\,x^2$, Fig. 1.

Similar numerals of reference indicate like parts in the different views.

Referring to the drawings, 1 represents the horizontal top or table portion of the present apparatus and which in the preferred type of the present invention shown in the drawings is of a size adapting the same for use by four operators in dipping or coating chocolate or other like confections and to this end will be provided with a series of four operating-slabs of marble or the like, as hereinafter more fully described.

2 represents the series of operating or coating slabs arranged in opposed pairs, as shown, and which are preferably supported by the underframe of the table-top 1, so as to be capable of ready removal and replacement when it is desired to remove or replace the central confection-pans of the apparatus.

3 represents the central open-topped confection-pans, one of which is arranged between each pair of coating-slabs 2, aforesaid. Such pans are removably supported by the underframe of the table-top 1 in a plane beneath the coating-slabs and so that the inner ends of the pair of slabs individual to a pan 3 will rest upon and inwardly overhang the top of such pan, as illustrated in Figs. 2 and 3 of the drawings. The purpose of such arrangement is to direct any drippings from the coating-slabs back into the pan without loss.

4 represents guard extensions on the ends of each pan to prevent any wasteful side splash of the contents of the pans.

5 represents heating-chambers formed in the underframe of the table-top and adapted to receive the central confection-pans 3, the said pans being adapted to depend into said chambers, as shown. Such chambers are maintained in a properly-heated condition by the hot-water-heating system of the present improvement, and in which—

6 is a closed rectangular-shaped tank forming the bottom of one of the heating-chambers 5 and adapted to contain the main supply of water used in the present heating system.

7 is a filling-funnel for the tank, connected by a pipe of some vertical height with the tank 6, so as to afford a pressure above ordinary atmospheric pressure to aid in the circulation of the water during the practical operation of the apparatus, as well as constitute a simple and efficient safety-outlet for the water in case of accidental overpressure in the tank 6.

8 is a valved vent-pipe connected near the top of the tank 6 and adapted for use in venting said tank of any air confined therein.

9 is a hot-water heater arranged in a plane below that of the tank 6, and preferably consisting of a cone-shaped coil of pipe provided with a lower inlet-neck 10 and with an upper outlet-neck 11.

12 is a connecting-pipe extending from the bottom of the tank 6 to the inlet-neck 10 of the water-heater aforesaid and adapted to conduct a supply of water from said tank to said heater during a continued practical use of the apparatus.

13 is a valved branch or outlet pipe connecting with the inlet-neck 10 and with pipe connection 9 aforesaid and adapted to afford a convenient means for draining the water away from the tank-heater and connections when required.

14 is an open-topped glass gage-tube connected by pipe connection 15 with the tank 6 and adapted to indicate the height of water in the same.

16 is a connecting-pipe extending from the outlet-neck 11 of the water-heater aforesaid to the tank 6 and adapted to conduct the heated water from said heater and discharge the same near the upper end of the tank and in a downward direction through the curved end of such pipe, as illustrated in Fig. 1.

18 is an intermediate coil of pipe forming a portion of the pipe connection 16 and arranged in the bottom portion of the companion heating-chamber 5 to that heretofore described. Such coil is adapted to constitute the means for heating the particular confection-pan located in such companion heating-chamber 5.

19 is a pad or layer of asbestos or like non-conducting material arranged between the under side of the coil of pipe 18 and the bottom of its containing-chamber and adapted to prevent a downward radiation of heat from said coil with the consequent waste of heat and discomfort to the lower extremities of the operators.

20 represents removal pads of asbestos or like non-conducting material arranged beneath the bottom of the open-topped pans 3 and between the same and the top of the closed tank 6 and the coil 18, respectively, and adapted for use after the confection in the pans has been properly melted to modify the heat and maintain the confection in proper working condition without danger of scorching or burning. In a preliminary melting of the confection such pads can be removed, so as to attain a more direct and rapid heating action.

21 is a burner of any usual and approved construction arranged beneath the water-heating coil 9 and adapted to heat the same in actual use. The drawings show in this connection an ordinary Argand type of gas-burner carried by the gas-supply pipe 22, extending vertically and which is made vertically adjustable in the holder-bracket 23 in order that said burner may be adjusted vertically with relation to the water-heating coil 9, so as to attain the most economic heating results.

24 is a housing or casing surrounding the water-heating coil 9 and adapted to confine and direct the heat and flame from the burner 21 around and against such coil.

25 is the outlet chimney or duct of the casing 24 aforesaid.

Having thus fully described my said invention, what I claim as new, and desire to secure by Letters Patent, is—

1. In a confectioner's stand or table of the character herein described, the combination of a table-top formed with an open-topped heating-chamber, a removable open-topped confection-pan arranged in said chamber, a closed tank forming the bottom of said chamber, means for introducing a filling of water into said tank, a coil of pipe constituting a water-heater and arranged in a plane below said tank, upper and lower pipe connections between the bottom of the tank and the bottom of the coil and between the top of said tank and the top of the coil, a casing inclosing said coil, and a burner arranged beneath said coil, substantially as set forth.

2. In a confectioner's stand or table of the character herein described, the combination of a table-top formed with a pair of open-topped heating-chambers, a pair of removable open-topped confection-pans arranged in said chambers, a closed tank forming the bottom of one of said chambers, means for introducing a filling of water into said tank, a coil of pipe constituting a water-heater, a lower pipe connection between the lower portion of the tank and the lower portion of the water-heater, an upper pipe connection between the upper portion of the tank and the upper portion of the water-heater, an intermediate coil formed in said upper pipe connection and arranged in one of the heating-chambers, a casing inclosing the water-heater, and a burner arranged beneath said coil, substantially as set forth.

3. In a confectioner's stand or table of the character herein described, the combination of a table-top formed with an open-topped heating-chamber, a removable open-topped confection-pan arranged in said chamber, a closed tank forming the bottom of said chamber, means for introducing a filling of water into said tank, a coil of pipe constituting a water-heater and arranged in a plane below said tank, upper and lower pipe connections between the top of said tank and the top of the coil, horizontal coating-slabs at the opposite sides of the confection-pans, a casing inclosing the water-heating coil, and a burner arranged beneath said coil, substantially as set forth.

4. In a confectioner's stand or table of the character herein described, the combination of a table-top formed with a pair of open-topped heating-chambers, a pair of removable open-topped confection-pans arranged in said chambers, a closed tank forming the bottom of one of said chambers, means for introducing a filling of water into said tank, a coil of pipe constituting a water-heater, a lower pipe connection between the lower portion of the tank and the lower portion of the water-heater, an upper pipe connection between the upper portion of the tank and the upper portion of the water-heater, an intermediate coil formed in said upper pipe connection and arranged in one of the heating-chambers, horizontal coating-slabs at the opposite sides of the confection-pans, a casing inclosing the water-heating coil, and a burner arranged beneath said coil, substantially as set forth.

5. In a confectioner's stand or table of the character herein described, the combination of a table-top formed with an open-topped heating-chamber, a removable open-topped confection-pan arranged in said chamber, a closed tank forming the bottom of said chamber, means for introducing a filling of water into said tank, a coil of pipe constituting a water-heater and arranged in a plane below said tank, upper and lower pipe connections between the bottom of the tank and the bottom of the coil and between the top of said tank and the top of the coil, removable horizontal coating-slabs arranged at the opposite sides of the confection-pans with their inner ends adapted to overhang said pans, a casing inclosing the water-heating coil, and a burner arranged beneath said coil, substantially as set forth.

6. In a confectioner's stand or table of the character herein described, the combination of a table-top formed with a pair of open-topped heating-chambers, a pair of removable open-topped confection-pans arranged in said chambers, a closed tank forming the bottom of one of said chambers, means for introducing a filling of water into said tank, a coil of pipe constituting a water-heater, a lower pipe connection between the lower portion of the tank and the lower portion of the water-heater, an upper pipe connection between the upper portion of the tank and the upper portion of the water-heater, an intermediate coil formed in said upper pipe connection and arranged in one of the heating-chambers, removable horizontal coating-slabs arranged at the opposite sides of the confection-pans with their inner ends adapted to overhang said pans, a casing inclosing the water-heating coil, and a burner arranged beneath said coil, substantially as set forth.

7. In a confectioner's stand or table of the character herein described, the combination of a table-top formed with an open-topped heating-chamber, a removable open-topped confection-pan arranged in said chamber, a closed tank forming the bottom of said chamber, a filling-funnel connected to the tank by a pipe connection of some vertical height, a valved vent-pipe connected to the upper portion of said tank, a coil of pipe constituting a water-heater and arranged in a plane below said tank, upper and lower pipe connections between the bottom of the tank and the bottom of the coil and between the top of the tank and the top of the coil, a casing inclosing said coil, and a burner arranged beneath said coil, substantially as set forth.

8. In a confectioner's stand or table of the character herein described, the combination of a table-top formed with an open-topped heating-chamber, a removable open-topped confection-pan arranged in said chamber, a closed tank forming the bottom of said chamber, means for introducing a filling of water into said tank, a removable pad of non-conducting material interposed between the bottom of the confection-pan and the top of said tank, a coil of pipe constituting a water-heater and arranged in a plane below said tank, upper and lower pipe connections between the bottom of the tank and the bottom of the coil and between the top of the tank and the top of the coil, a casing inclosing said coil, and a burner arranged beneath said coil, substantially as set forth.

9. In a confectioner's stand or table of the character herein described, the combination of a table-top formed with a pair of open-topped heating-chambers, a pair of removable open-topped confection-pans arranged in said chambers, a closed tank forming the bottom of one of said chambers, means for introducing a filling of water into said tank, a coil of pipe constituting a water-heater, a lower pipe connection between the lower portion of the tank and the lower portion of the water-heater, an upper pipe connection between the upper portion of the tank and the upper portion of the water-heater, an intermediate coil formed in said upper pipe connection and arranged in one of the heating-chambers, a pad of non-conducting material between the under side of the intermediate coil and the bottom of the heating-chamber, a casing inclosing the water-heating coil, and a burner arranged beneath said coil, substantially as set forth.

Signed at Chicago, Illinois, this 12th day of March, 1903.

GEORGE F. DICKSON.

Witnesses:
 ROBERT BURNS,
 HENRY A. NOTT.